US012539927B2

(12) United States Patent
Mickelson et al.

(10) Patent No.: US 12,539,927 B2
(45) Date of Patent: Feb. 3, 2026

(54) SNOW TRACK FOR A SNOWMOBILE

(71) Applicant: Polaris Industries Inc., Medina, MN (US)

(72) Inventors: Joshua J. Mickelson, Medina, MN (US); Michael A. Hedlund, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 525 days.

(21) Appl. No.: 17/740,989

(22) Filed: May 10, 2022

(65) Prior Publication Data
US 2022/0363340 A1 Nov. 17, 2022

Related U.S. Application Data

(60) Provisional application No. 63/187,203, filed on May 11, 2021.

(51) Int. Cl.
*B62D 55/26* (2006.01)
*B62M 27/02* (2006.01)

(52) U.S. Cl.
CPC ............ *B62D 55/26* (2013.01); *B62M 27/02* (2013.01); *B62M 2027/027* (2013.01)

(58) Field of Classification Search
CPC . B62D 55/26; B62D 55/286; B62M 2027/027
USPC ........................................................ 305/165
See application file for complete search history.

(56) References Cited

U.S. PATENT DOCUMENTS

| | | | |
|---|---|---|---|
| 7,422,295 B2 * | 9/2008 | Rasmussen .......... | B62D 55/244 305/179 |
| 8,033,619 B2 * | 10/2011 | Bellemare ............ | B62D 55/244 305/195 |
| 2004/0026995 A1 * | 2/2004 | Lemieux .............. | B62D 55/244 305/178 |
| 2006/0238027 A1 * | 10/2006 | Dandurand .......... | B62D 55/244 180/9.1 |

(Continued)

FOREIGN PATENT DOCUMENTS

| | | |
|---|---|---|
| CA | 2392523 A1 | 1/2003 |
| CA | 2436493 A1 | 2/2004 |
| CA | 2763978 A1 | 7/2012 |

OTHER PUBLICATIONS

Requisition for related Canadian Application No. 3159314; Dated: Aug. 2, 2024; 6 pages.

(Continued)

*Primary Examiner* — S. Joseph Morano
*Assistant Examiner* — Alex Palmer
(74) *Attorney, Agent, or Firm* — Merchant & Gould P.C.

(57) ABSTRACT

An endless track for propelling a snowmobile. The endless track includes an inner drive surface and an outer ground-engaging surface opposite to the inner drive surface. A first side surface is opposite to a second side surface. A plurality of first side lugs are adjacent to the first side surface. A plurality of second side lugs are adjacent to the second side surface. The plurality of first side lugs and the plurality of second side lugs provide traction when the snowmobile is operated off-axis and tilted on its side as well as provides traction surfaces on additional planes other than the outer carcass of the endless track when the track is submerged in the snow.

18 Claims, 14 Drawing Sheets

(56) References Cited

U.S. PATENT DOCUMENTS

2009/0051217 A1\* 2/2009 Farwell .................. B62M 27/02
305/165
2018/0201335 A1\* 7/2018 Nam ...................... B62D 55/26

OTHER PUBLICATIONS

Examination Search Report for related Canadian Application No. 3159314; dated: Jul. 24, 2023; 7 pages.
Examination Search Report for Canadian Application No. 3,159,314, dated Sep. 18, 2025, 9 pages.

\* cited by examiner

SNOW TRACK FOR A SNOWMOBILE

CROSS REFERENCE

This application claims benefit to U.S. Provisional Application No. 63/187,203 filed May 11, 2021. The entire disclosure of the above application is incorporated herein by reference.

FIELD

The present disclosure relates to an endless track for a snowmobile, the track includes side lugs to enhance traction when the snowmobile is operated on its side (i.e., off-axis), as well as provides traction surfaces on additional planes other than the outer carcass of the endless track.

BACKGROUND

This section provides background information related to the present disclosure, which is not necessarily prior art.

Tracked vehicles, such as a snowmobile, include an endless track or belt that is driven by a snowmobile drive assembly. These drive assemblies generally have a pair of spaced apart wheel structures on opposed sides or ends of the snowmobile to carry and drive the track. The track typically includes an outer ground-engaging surface and an inner drive surface. The inner drive surface generally has a series of longitudinally spaced lugs or members that are driven by a drive sprocket of the snowmobile and are also used for guiding relative to a rail beam or slide, as is known in the art. The ground-engaging surface of a typical track will include various tread configurations that are both spaced apart and non-continuous both longitudinally and laterally relative to the track for use in engaging various types of snow conditions.

In backcountry/mountain snowmobiling, there are several maneuvers that require operating the snowmobile while tilted to its side and when the entire track is submerged in the snow. Side-hilling, carving, and sliding across mountain slopes and meadows are some of the riding maneuvers that require as much traction as possible to keep the snowmobile from getting stuck, and maneuvering in a more efficient manner.

Existing tracks provide good forward momentum and are suitable for their intended use. A track that provides enhanced traction when the snowmobile is operated off-axis, such that the track is tilted on its side, would be desirable. The present disclosure advantageously includes an endless track that provides enhanced traction when the snowmobile is operated off-axis and when the entire track is submerged in the snow. The present disclosure provides numerous advantages and unexpected results, as explained in detail herein and as one skilled in the art will appreciate.

SUMMARY

This section provides a general summary of the disclosure, and is not a comprehensive disclosure of its full scope or all of its features.

The present disclosure includes an endless track for propelling a snowmobile. The endless track includes an inner drive surface and an outer ground-engaging surface opposite to the inner drive surface. A first side surface is opposite to a second side surface. A plurality of first side lugs are adjacent to the first side surface. A plurality of second side lugs are adjacent to the second side surface. The plurality of first side lugs and the plurality of second side lugs provide traction when the snowmobile is operated off-axis and tilted on its side.

The present disclosure further includes an endless track for propelling a snowmobile. The endless track has an outer ground-engaging surface, and an inner drive surface opposite to the outer-ground engaging surface. A first side surface is opposite to a second side surface. Outer lugs extend from the outer ground-engaging surface. Drive lugs extend from the inner drive surface and are configured to cooperate with a drive member of the snowmobile for rotating the endless track. First inner treads extend from the inner drive surface adjacent to the first side surface. Behind the first inner treads, the first side surface defines first recesses. Second inner treads extend from the inner drive surface adjacent to the second side surface. Behind the second inner treads, the second side surface defines second recesses. The first recesses and the second recesses are configured to expose the first inner treads and the second inner treads respectively to snow when the snowmobile is operated off-axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate tracked vehicle. The examples disclosed below are not intended to be exhaustive or to limit the disclosure to the precise forms disclosed in the following detailed description. Rather, the examples are chosen and described so that others skilled in the art may utilize their teachings.

Figure 1:
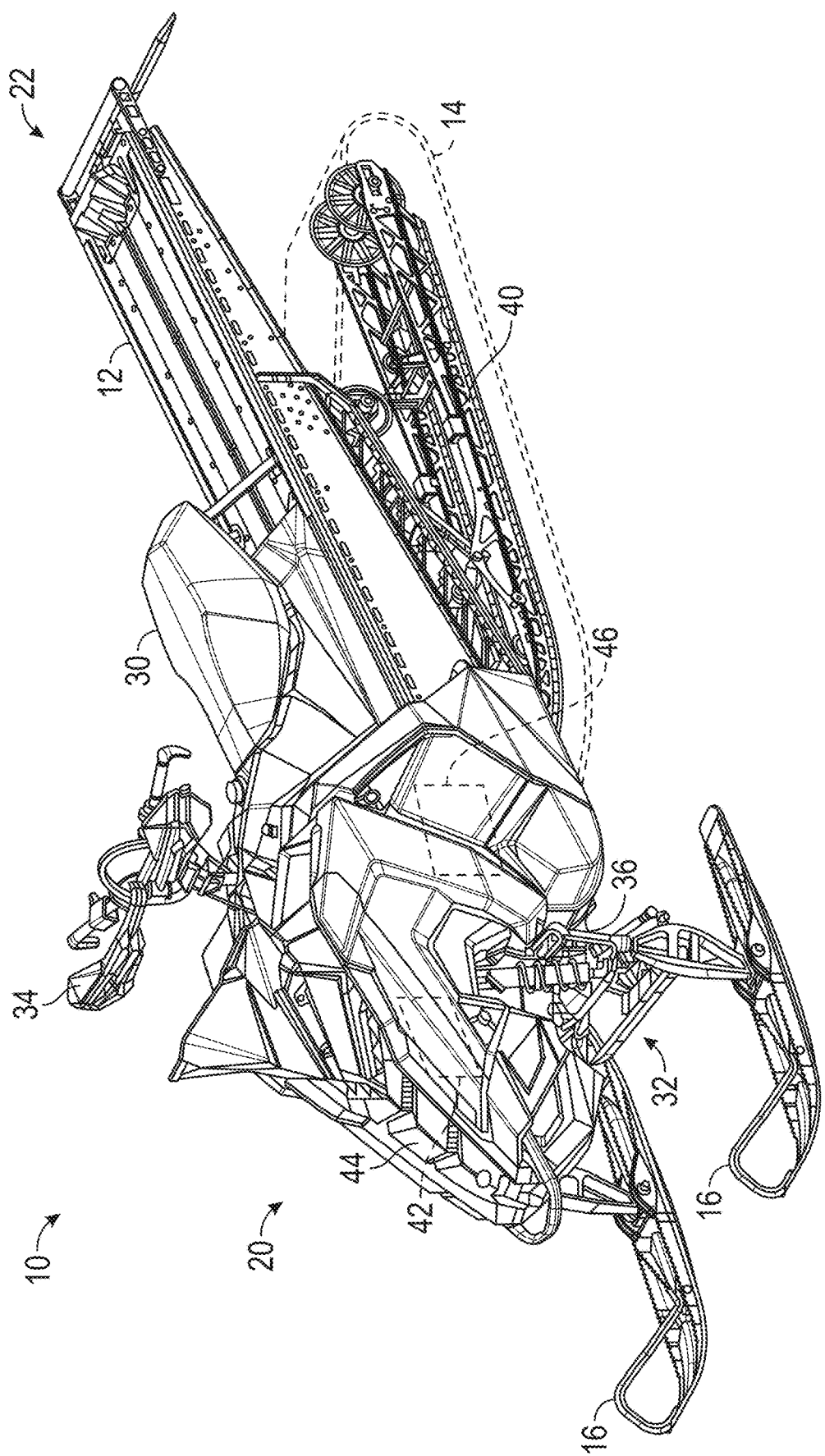
FIG. 1 is a perspective view of an exemplary snowmobile.

Referring now to FIG. 1, one embodiment of an exemplary snowmobile 10 is shown. The snowmobile 10 includes a chassis assembly 12, an endless belt or track 14, and a pair of front skis 16. The skis 16 are at a front-end 20 of the snowmobile 10. The front-end 20 is opposite to a rear-end 22 of the snowmobile 10.

The snowmobile 10 also includes a seat assembly 30, which is coupled to the chassis assembly 12. A front suspension assembly 32 is also coupled to the chassis assembly 12. The front suspension assembly 32 may include handlebars 34 for steering, shock absorbers 36 and the skis 16. A rear suspension assembly 40 is also coupled to the chassis assembly 12. The rear suspension assembly 40 may be used to support the endless track 14 for propelling the snowmobile 10. An electrical console assembly is also coupled to the chassis assembly 12. The snowmobile 10 includes an engine assembly 42 arranged under a hood assembly 44 of the chassis assembly 12. A drivetrain assembly 46 converts a rotating force from the engine assembly 42 into a potential force to use, drive, and rotate the endless belt or track 14, which propels the snowmobile 10.

Figure 8:
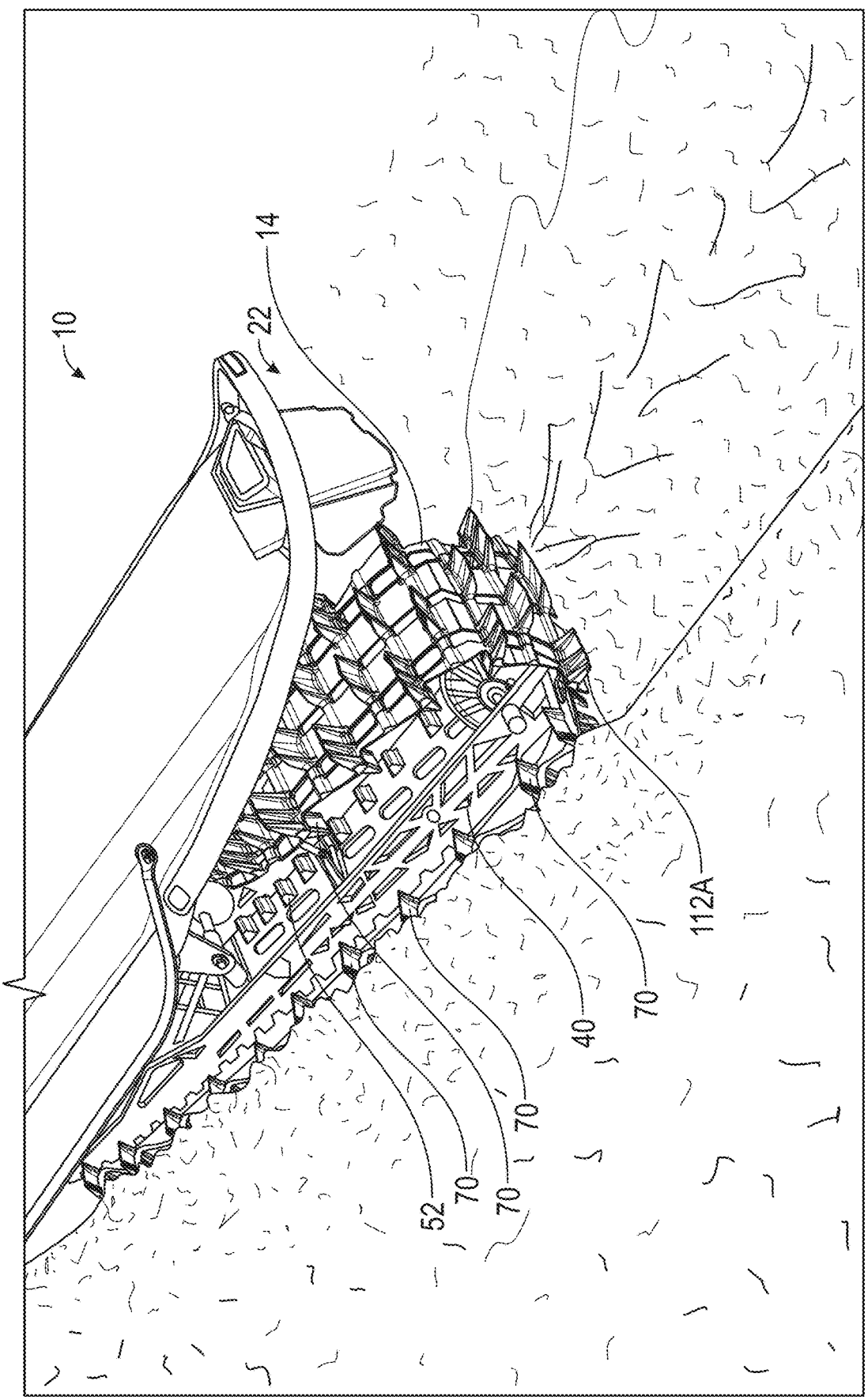
FIG. 8 illustrates the exemplary snowmobile with the endless track turned on its side when the snowmobile is being operated off-axis.

The snowmobile 10 illustrated in the example of FIG. 1 is generally a mountain-type snowmobile propelled by the endless track 14. However, any type of tracked snowmobile or tracked vehicle may include the endless track 14 of the present disclosure. For example, touring, racing, performance, and other snowmobile configurations may be propelled by the endless track 14. The endless track 14 is configured to operate in any type of snow conditions, such as, but not limited to, sugar, ice, wet, heavy, as well as on various terrains. The track 14 is also configured to operate over any suitable terrain, such as track, mountainous, ice, etc. As described herein, the track 14 is particularly suitable for propelling the snowmobile 10 when the snowmobile is operated on its side (i.e., off-axis), as illustrated in FIG. 8 for example.

With additional reference to FIGS. 2-8, an exemplary configuration of the endless track 14 accordance with the present disclosure will now be described in detail. The track 14 is a continuous track that rotates 360° in the direction of arrow DR to propel the snowmobile 10. The track 14 is primarily formed of a rubber material, including multiple fabric layers, as is known in the art.

Figure 2:
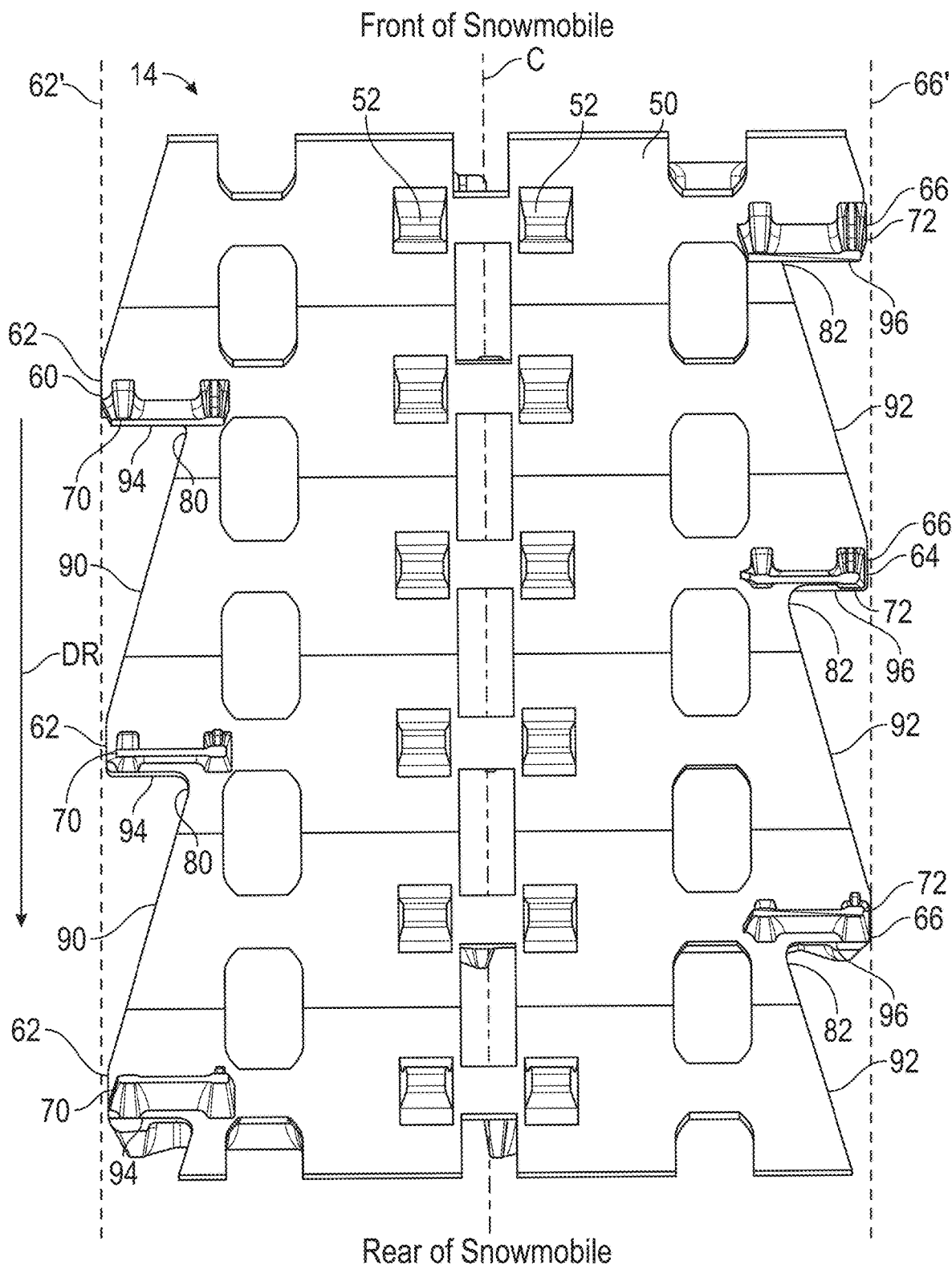
FIG. 2 is a plan view of an inner drive surface of an exemplary endless track for the snowmobile of FIG. 1.
Figure 3:
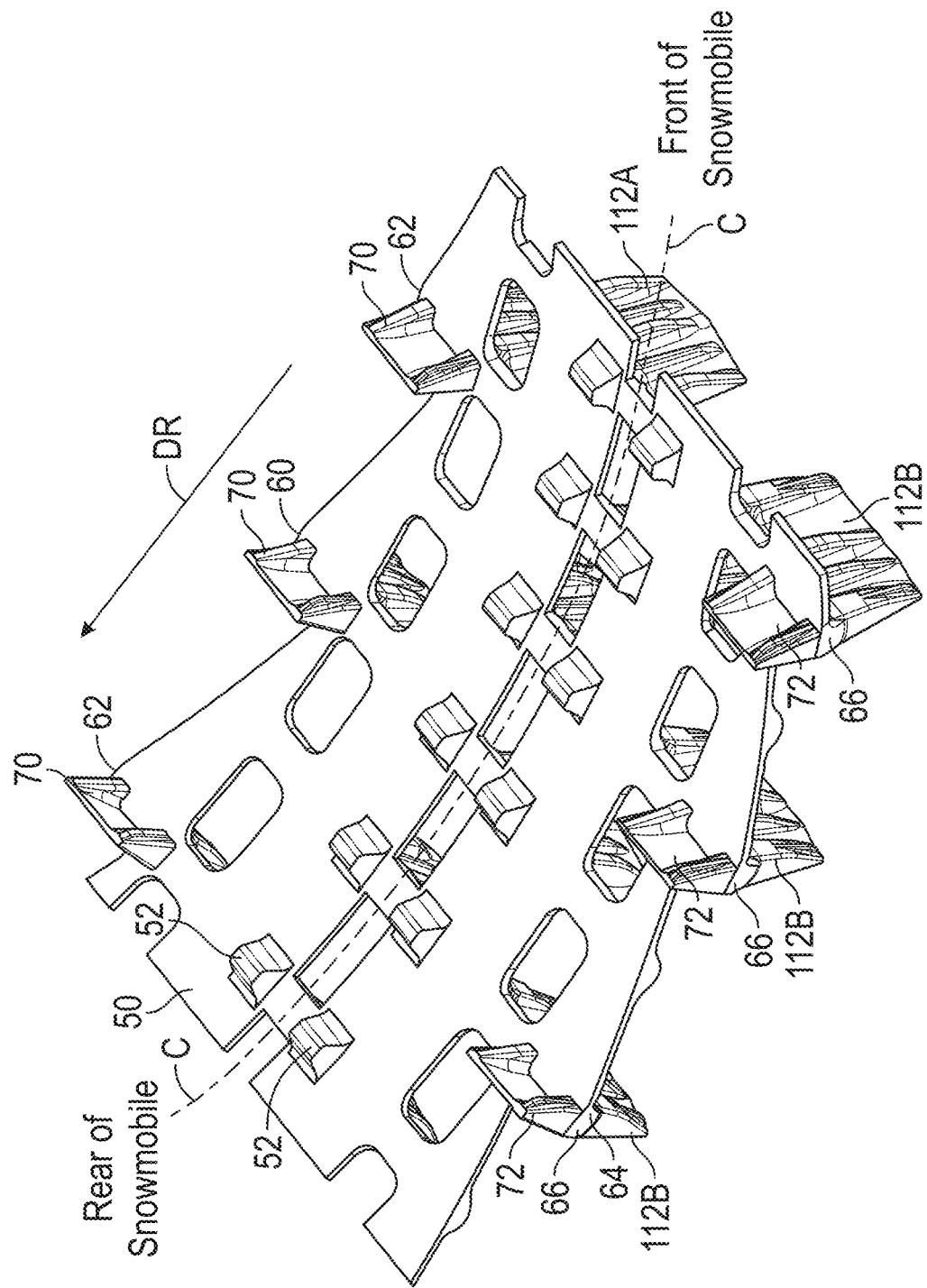
FIG. 3 is a first perspective view of the inner drive surface of the endless track.
Figure 4:
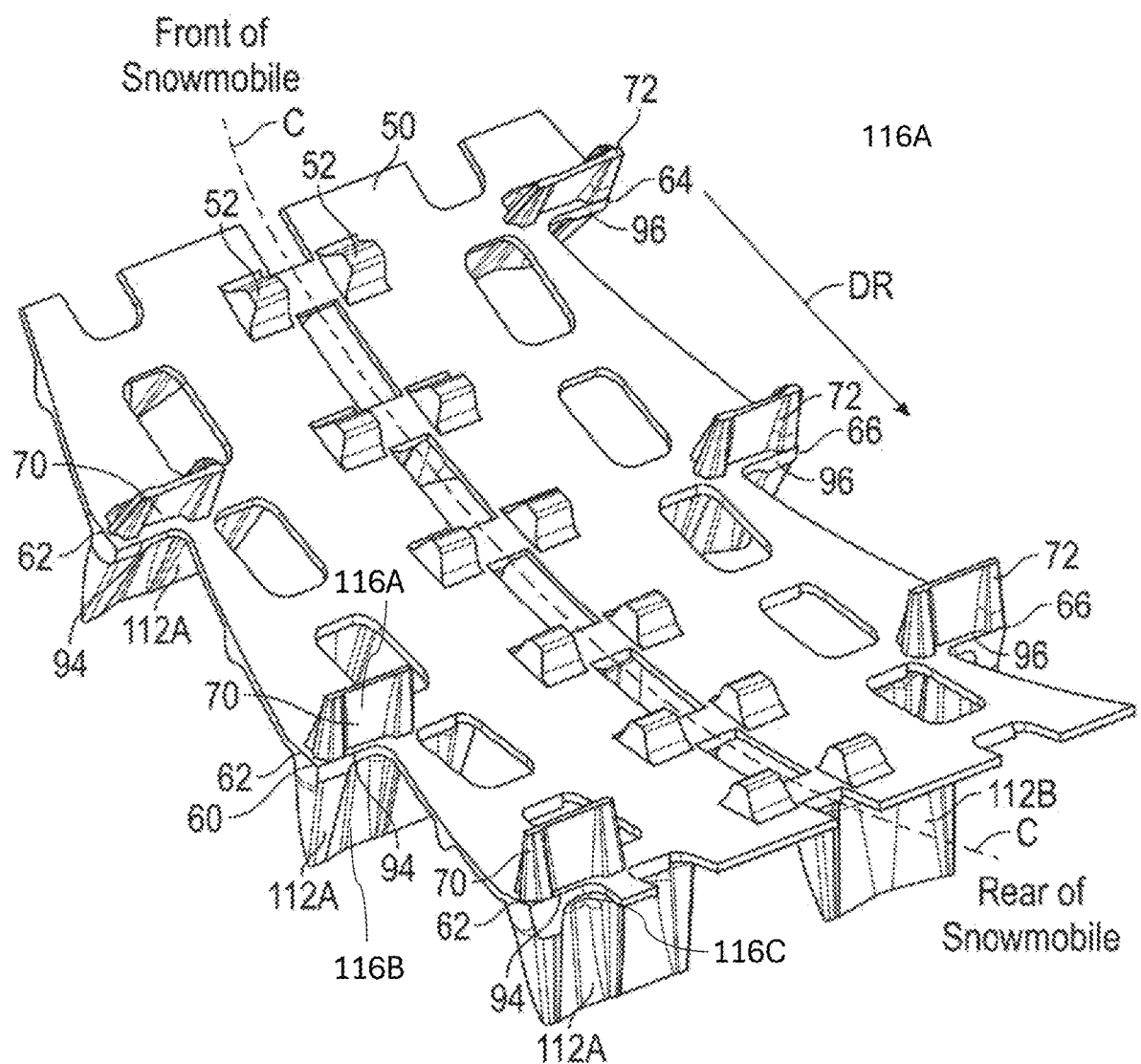
FIG. 4 is a second perspective view of the inner drive surface of the endless track.

With particular reference to FIGS. 2, 3 and 4, the track 14 includes an inner drive surface 50. The direction of rotation of the track 14, when the snowmobile is moving forward, is represented in the drawings by arrow DR. A plurality of drive lugs 52 extend outward from, and generally perpendicular to, the inner drive surface 50. In the example illustrated, the drive lugs 52 are arranged in pairs, with each lug 52 of each pair being arranged on opposite sides of a center line C of the track 14. The track 14 is propelled or driven by both an internal and external sprocket drive having a convolute and involute drive system or drive sprocket. The drive lugs 52 cooperate with a drive sprocket to propel and drive the track 14, as is known in the art.

The track includes a first side surface 60 and a second side surface 64, which is opposite to the first side surface 60. Adjacent to the first side surface 60, a plurality of first inner treads 70 extend outward from, and generally perpendicular to, the inner drive surface 50. The first inner treads 70 are spaced apart along the inner drive surface 50 at the first side surface 60. Adjacent to the second side surface 64, a plurality of second inner treads 72 extend outward from, and generally perpendicular to, the inner drive surface 50. The second inner treads 72 are spaced apart along the inner drive surface 50 at the second side surface 64. The first and second inner treads 70, 72 may be made of any suitable material, such as any suitable polymeric material, and may be molded simultaneously with the remainder of the track 14. The first and second inner treads 70, 72 may each extend any suitable distance from the inner drive surface, such as about 1.5 inches. As depicted, each of the first and second inner treads 70, 72 may define a first thrust panel 116A extending generally perpendicularly from the inner drive surface 50 and including lateral side supports. The first and second inner treads 70, 72 are outboard of the chassis 12, which allows the first and second inner treads 70, 72 to contact the snow or other surface when the snowmobile 10 is tilted to one side or the other (see FIG. 8). Thus, the first and second inner treads 70, 72 advantageously facilitate increased traction when the snowmobile 10 is operated off-axis.

At the first side surface 60, the track 14 defines first recesses 80. The first recesses 80 are recessed inward towards the center line C of the track 14 from a first outermost portion 62 of the first side surface 60 at any suitable distance, such as about 2 inches (and up to about 3.5 inches) when the track 14 is 15 inches wide. The first recesses 80 are spaced apart from each another along the first side surface 60. Between each of the first recesses 80 is one of the first inner treads 70.

At the second side surface 64, the track 14 defines second recesses 82. The second recesses 82 are recessed inward towards the center line C of the track 14 from a second outermost portion 66 of the second side surface 64 at any suitable distance, such as about 2 inches (and up to about 3.5 inches) when the track 14 is 15 inches wide. The second recesses 82 are spaced apart from each other along the second side surface 64. Between each of the second recesses 82 is one of the second inner treads 72.

The first and second recesses 80, 82 may have any suitable size and shape, and may be arranged at any suitable positions, to facilitate engagement between the first and second inner treads 70, 72 respectively and the snow (or other surface) when the snowmobile is operated off-axis (such that the snowmobile is tilted to its right or left side) (see FIG. 8). In the example illustrated, the first and second recesses 80, 82 are recessed to the fullest extent (and are thus closest to the center line C) directly adjacent to the first inner treads 70 and the second inner treads 72 respectively.

First angled surfaces 90 extend from each first recess 80 outward and away from the center line C to the first outermost portion 62 of the of the first side surface 60. Second angled surfaces 92 extend from each second recess 82 outward from the center line C to the second outermost portion 66 of the second side surface 64. The first and second angled surfaces 90, 92 may be linear as illustrated, or may have any other suitable shape, such as stair-stepped, zig-zag, etc.

First linear surfaces 94 extend from each one of the first recesses 80 to the first outermost portion 62 of the first side surface 60. In the example illustrated, the first linear surfaces 94 extend perpendicular to the center line C. Second linear surfaces 96 extend from each one of the second recesses 82 to the second outermost portion 66 of the second side surface 64. In the example illustrated, the second linear surfaces 96 extend perpendicular to the center line C. The first and second linear surfaces 94, 96 may be perpendicular to the center line C as illustrated, nearly perpendicular to the center line C, or arranged at any suitable angle relative to the center line C. The first and second linear surfaces 94, 96 face the rear end of the snow-mobile when on a surface that the snowmobile is traversing.

As illustrated throughout the drawings, the first recesses 80 and the second recesses 82 are offset, such that the first recesses 80 do not align across the center line C with the second recesses 82. Similarly, the first inner treads 70 are offset from the second inner treads 72. In other applications, however, the first and second recesses 80, 82, as well as the first and second inner treads 70, 72 may be aligned across the center line C.

The first and second inner treads 70, 72 are optional, and thus need not be included with the track 14. In the absence of the first and second inner treads 70, 72, outer edges of the first side surface 60 and the second side surface 64 may act as drive surfaces when the snowmobile 10 is operated off-axis. Specifically, the first and second recesses 80, 82, the first and second angled surfaces 90, 92, and the first and second linear surfaces 94, 96 may together act as drive surfaces with or without inclusion of the first and second inner treads 70, 72. The first and second recesses 80, 82 may protrude inward to any suitable distance. For example, when the track 14 is 15 inches wide as measured between the first and the second outermost portions 62', 66' (see FIG. 2), and the tunnel of the snowmobile 10 is 15 inches wide, the first and second recesses 80, 82 may each be recessed inward 1 inch from the first and the second outermost portions 62', 66' respectively.

Figure 5:
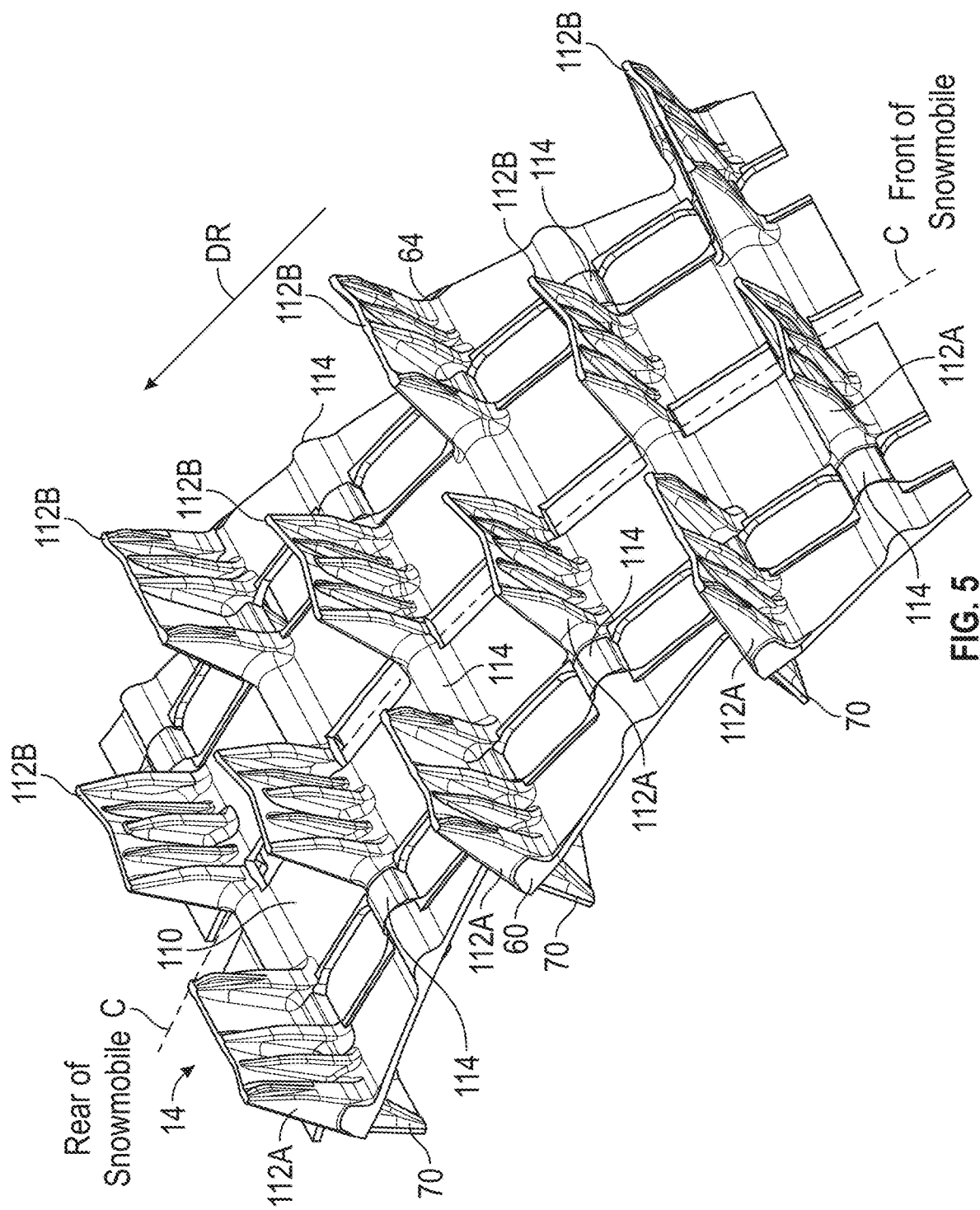
FIG. 5 is a first perspective view of an outer, ground-engaging surface of the endless track.
Figure 6:
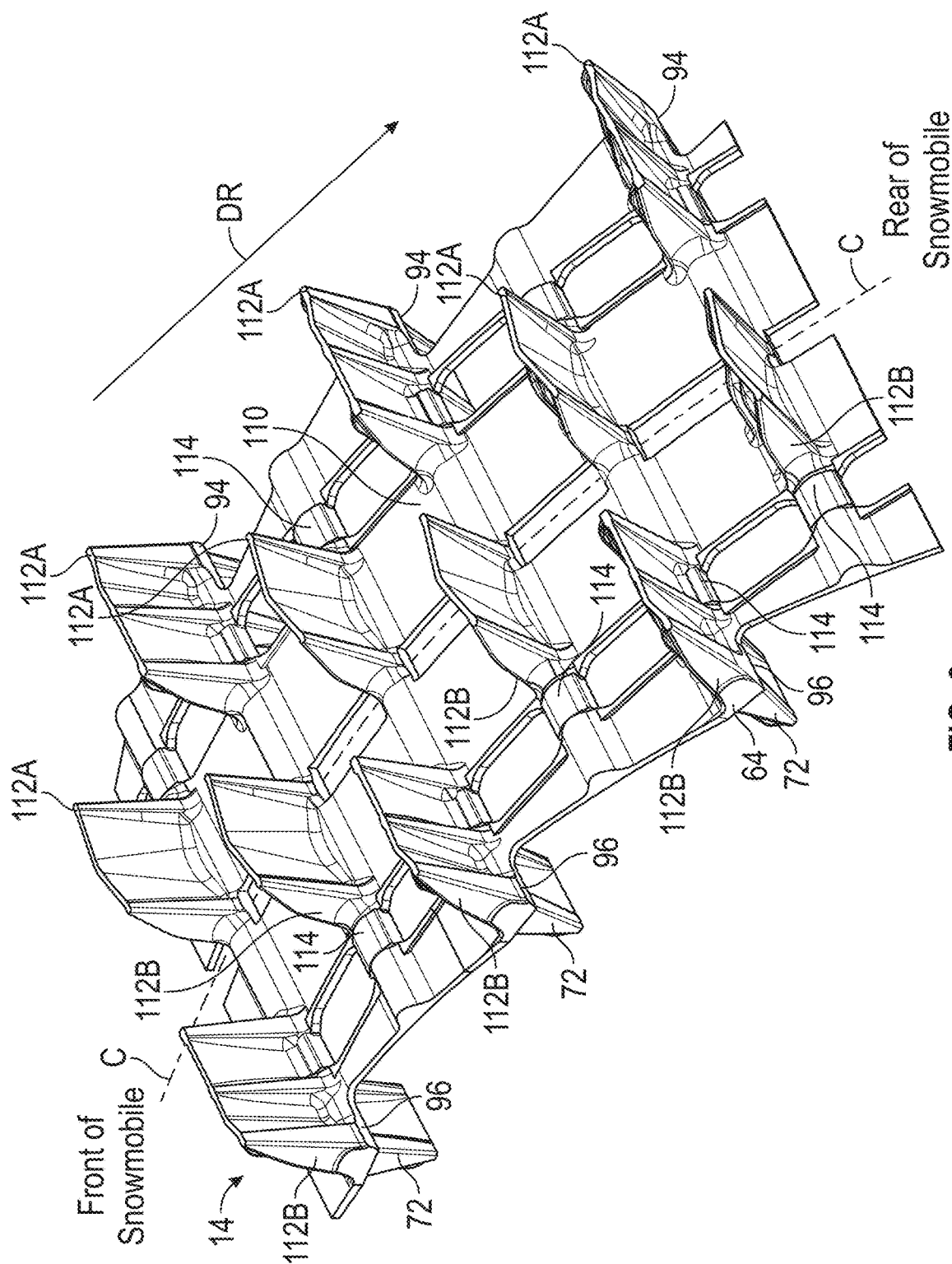
FIG. 6 is a second perspective view of the outer, ground-engaging surface of the endless track.
Figure 7:
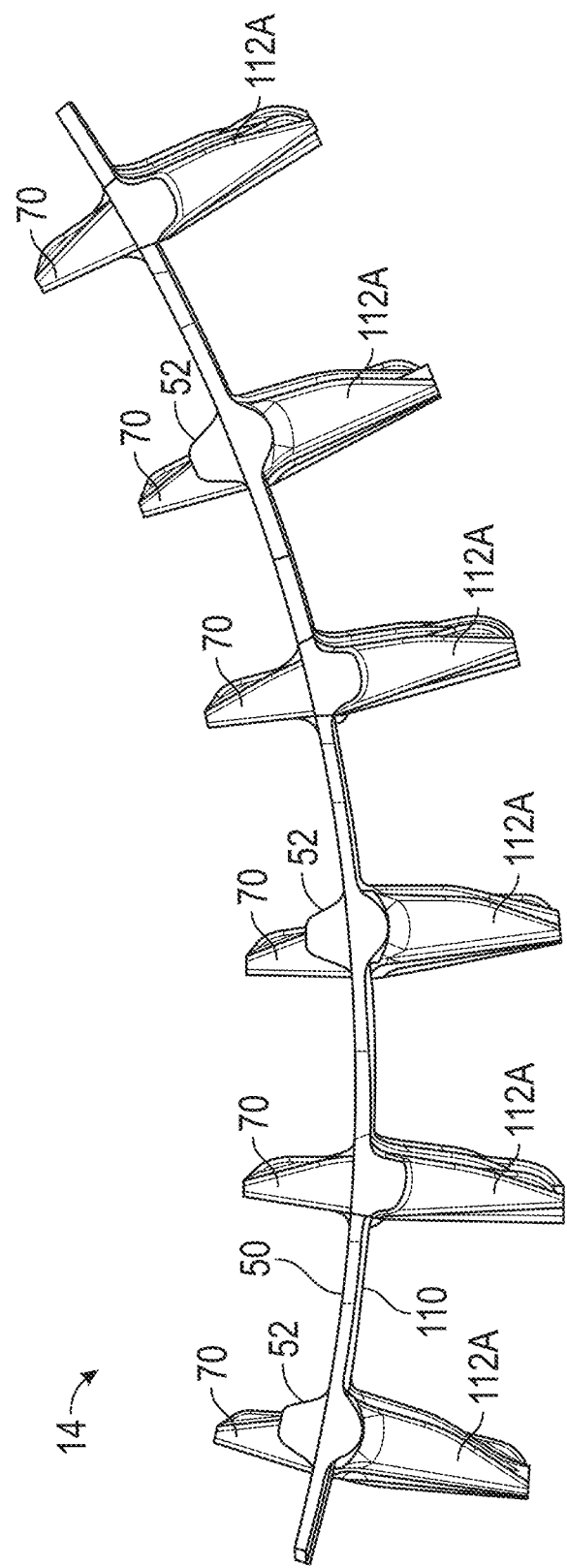
FIG. 7 is a side view of the endless track.

With additional reference to FIGS. 5, 6, and 7, the track 14 includes an outer ground engaging surface 110, which is opposite to the inner drive surface 50. Extending from the outer ground engaging surface 110 are a plurality of outer treads (or lugs) 112A, 112B. The outer lugs 112A, 112B are used to engage the ground or terrain and drive the snowmobile 10 forward or reverse.

The outer lugs 112A, 112B can each extend from reinforcing rods 114, which are embedded in the track 14 and extend perpendicular to the center line C of the track 14. The reinforcing rods 114 may be spaced apart at any suitable drive pitch. The reinforcing rods 114 may extend entirely to, or nearly to, the first side surface 60 and the second side surface 64. In the example illustrated, the rods 114 are arranged in an alternating manner with one rod extending to the first side surface 60 (but not all the way to the second side surface 64), arranged between two rods 114 extending to the second side surface 64 (but not all the way to the first side surface 60). By not extending entirely to the first or second side surfaces 60, 64, the rods 114 allow for more flexibility at the first and second side surfaces 60, 64, which facilitates digging of the track into the snow when the snowmobile 10 is operated off-axis.

The first and second inner treads 70, 72 extend from the reinforcing rods 14 as well. In the example illustrated, each one of the reinforcing rods 14 has only one tread 70, 72, which are arranged in an alternating configuration from the first side surface 60 to the second side surface 64. More specifically, each rod 114 having a tread 70 adjacent to the first side surface 60 is between two rods 114 having treads 72 adjacent to second side surface 64. In other configurations, one or more of the reinforcing rods 114 may not include treads 70, 72 at all.

The outer lugs 112A, 112B may be arranged in any suitable configuration, and any suitable number of outer lugs 112A, 112B may be included. For example and as illustrated, the outer lugs 112A, 112B may be arranged in rows of two outer lugs 112A, 112B each, with first ones 112A of the outer lugs proximate to the first side surface 60 and second ones 112B of the outer lugs proximate to the second side surface 64. Alternating ones of the first outer lugs 112A are adjacent to the first side surface 60 directly opposite to the first inner treads 70. Between two of the outer lugs 112A directly opposite to the first inner treads 70 is an outer lug 112A recessed inward from the first side surface 60 towards, or to, the center line C. Alternating ones of the second outer lugs 112B are adjacent to the second side surface 64 directly opposite to the second inner treads 72. As depicted, each of the outer lugs 112A, 112B may define a second thrust panel 116B extending generally perpendicularly from the outer ground engaging surface 110 and including lateral side supports. Between two of the outer lugs 112B directly opposite to the second inner treads 72 is an outer lug 112B recessed inward from the second side surface 64 towards, or to, the center line C. In certain embodiments, the first thrust panel 116A and the opposing second thrust panel 116B may be aligned on opposite sides of the endless track and together define a continuous thrust panel 116C extending between the inner drive surface 50 and the outer ground engaging surface 110. The outer lugs 112A and 112B may be configured in any other suitable manner as well.

With reference to FIG. 8, when the snowmobile 10 is tilted to its side, the track 14 in accordance with the present disclosure advantageously provides improved traction with the snow or other surface that the snowmobile 10 is being operated on. Specifically, the inner treads 70, 72 are configured to "dig" into the snow when the snowmobile 10 is operated off-axis. The first and second recesses 80, 82 expose rear ends of the inner treads 70, 72 respectively to facilitate cooperation between the inner treads 70, 72 and the snow. Thus, the first inner treads 70 along with the first side surface 60 and the first outer lugs 112A together provide first side lugs adjacent to the first side surface 60 of the track 14. The second inner treads 72 along with the second side surface 64 and the second outer lugs 112B together provide second side lugs at the second side surface 64 of the track 14. These first and second side lugs provide enhanced traction for the track 14 when tilted on its side.

Figure 9A:
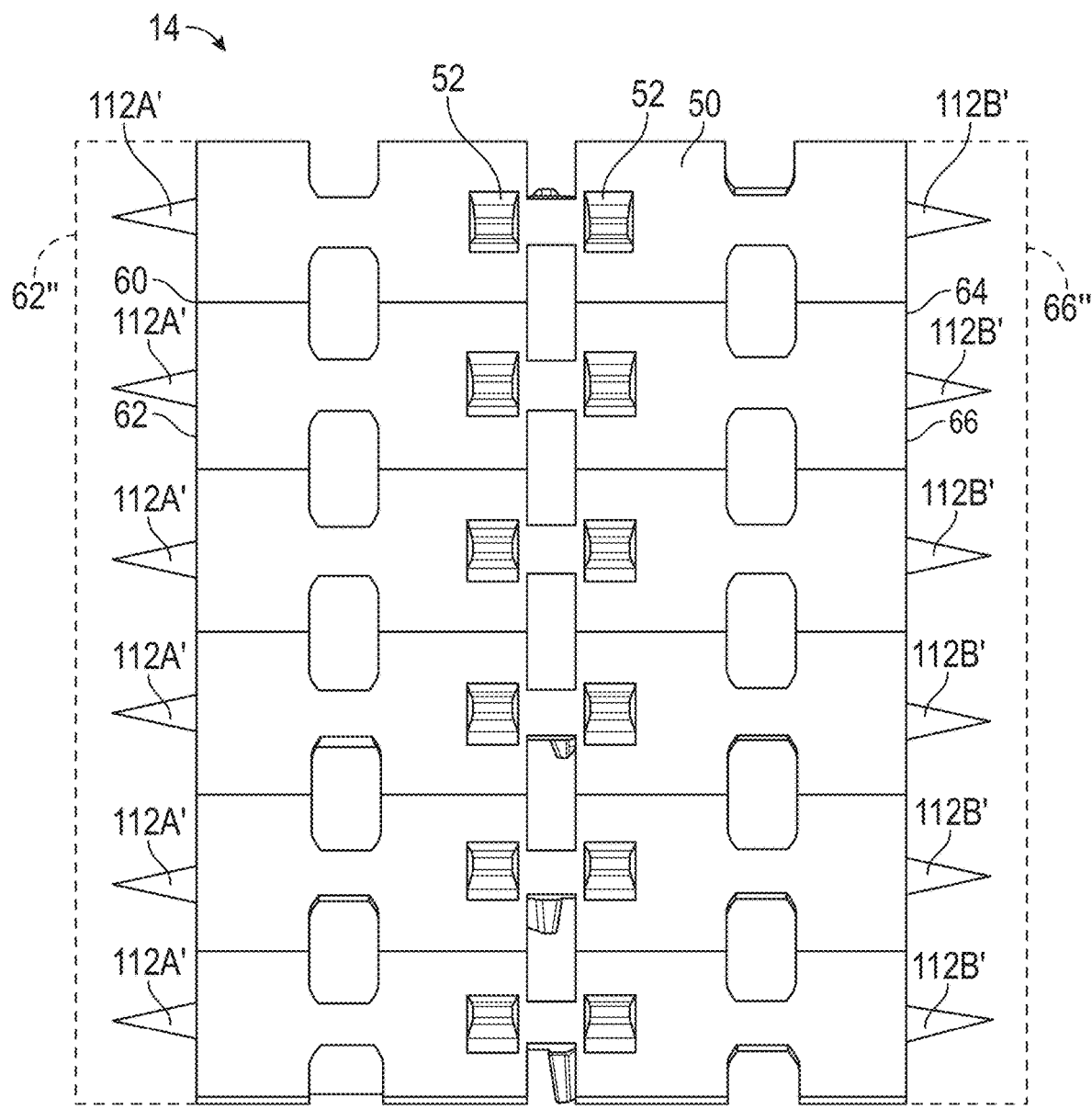
FIG. 9A is a plan view of an inner drive surface of another exemplary track in accordance with the present disclosure.
Figure 9B:
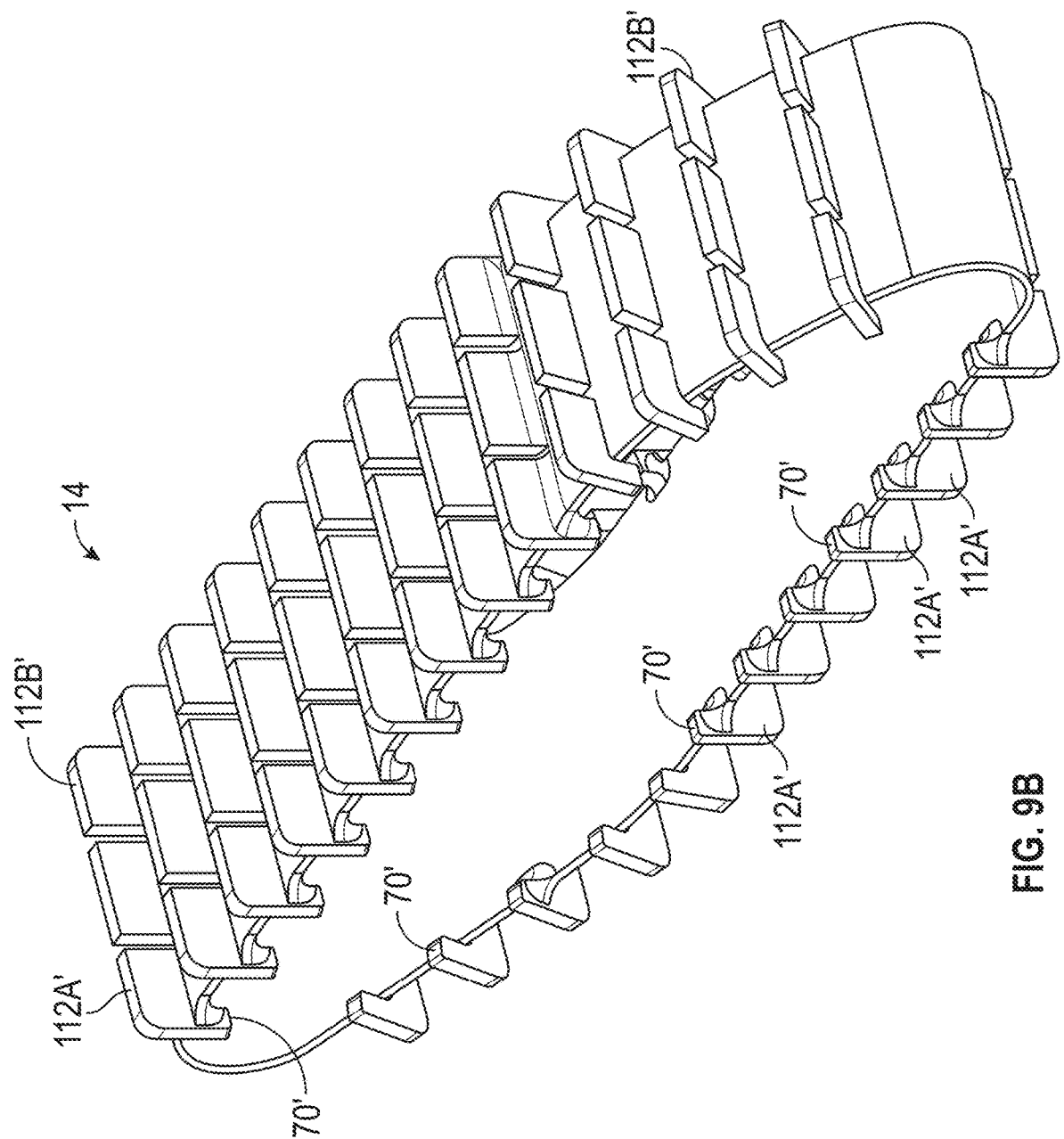
FIG. 9B is a perspective view of the track of FIG. 9A.
Figure 9C:
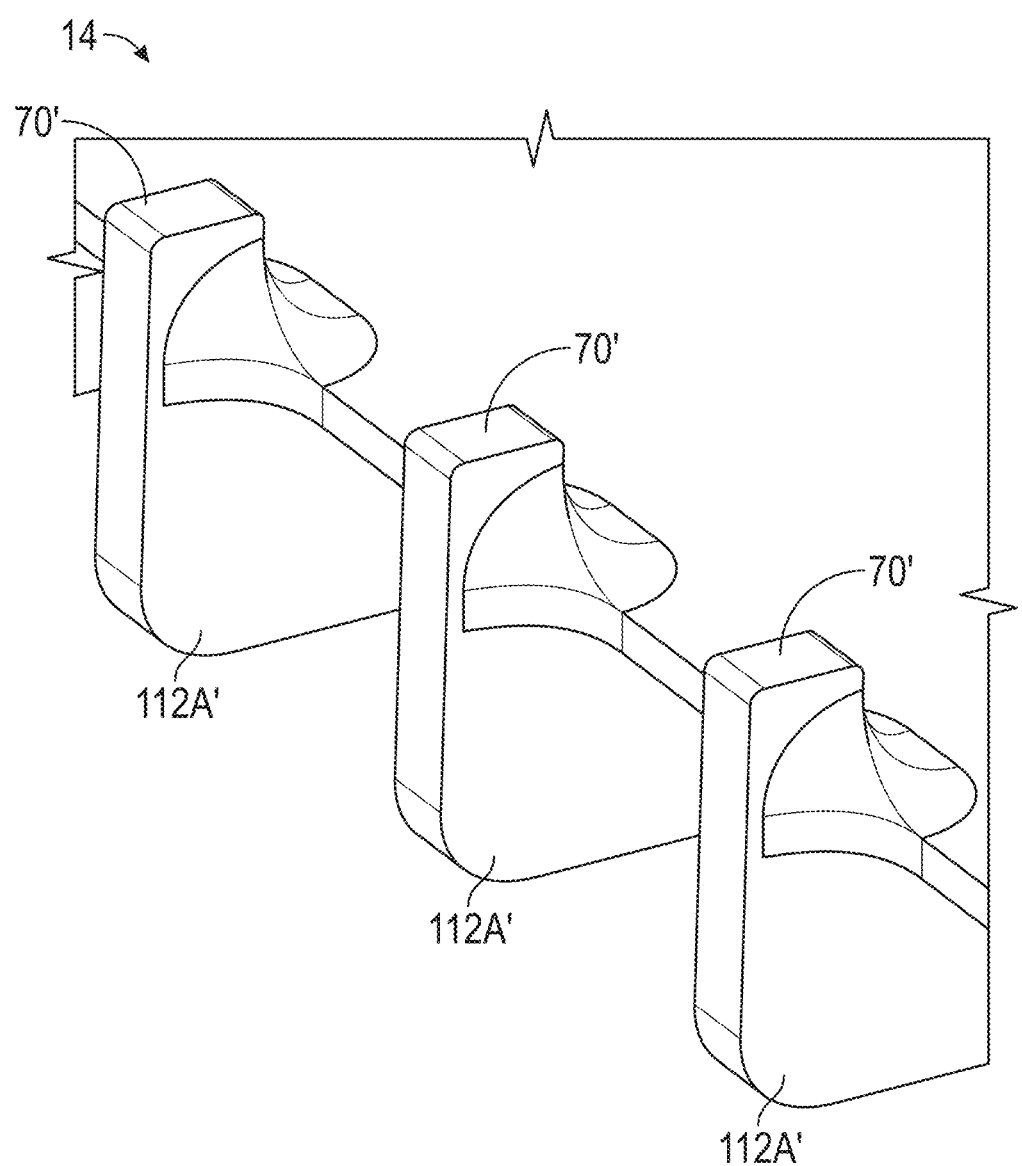
FIG. 9C is a perspective view of exemplary side lugs of the track of FIG. 9A.

With additional reference to FIGS. 9A, 9B, and 9C, the track 14 may be configured with outer lugs 112A', 112B' that protrude from the first and second side surfaces 60, 64 respectively. Thus, in the configuration of FIGS. 9A, 9B, and 9C, the outer lugs 112A', 112B' are also side lugs that are configured to "dig" in the snow when the snowmobile 10 is operated off-axis. The outer lugs 112A', 112B' may be rounded at their outer edges as illustrated to reduce the effort required to tilt the snowmobile 10 off-axis and make it easier to initiate a side-hill maneuver. Inner treads 70' may be integral with outer lugs 112A', and inner treads 72' may be integral with outer lugs 112B', thereby enhancing traction when the snowmobile 10 is operated off-axis.

The outer lugs 112A, 112B, 112A', 112B' protrude outward relative to the first and second side surfaces 60, 64 of the finished, completely manufactured, track 14, which may be more or less narrow than a raw track used during the manufacturing process. As illustrated in FIG. 9A, for example, the finished track 14 may be formed from a material having a width extending between first and second outermost portions 62", 66", and then the width may be cut down to a finished width extending between first and second outermost portions 62, 66. Alternatively, the finished track 14 may be formed from a material having a width extending between the first and second outermost portions 62, 66, and the outer lugs 112A', 112B' may be secured at the first and second side surfaces 60, 64 respectively, such that the outer lugs 112A' extend beyond the outermost portion 62 of first side surface 60, and outer lugs 112B' extend beyond the outermost portion 66 of second side surface 64. If the width of the tunnel of the snowmobile 10 is 15 inches, for example, the stock track width between the first and the second outermost portions 62, 66 may be 13 inches, the outer lugs 112A' may extend 1 inch from the outermost portion 62, and the outer lugs 112B' may extend 1 inch from the outermost portion 66.

Figure 10A:
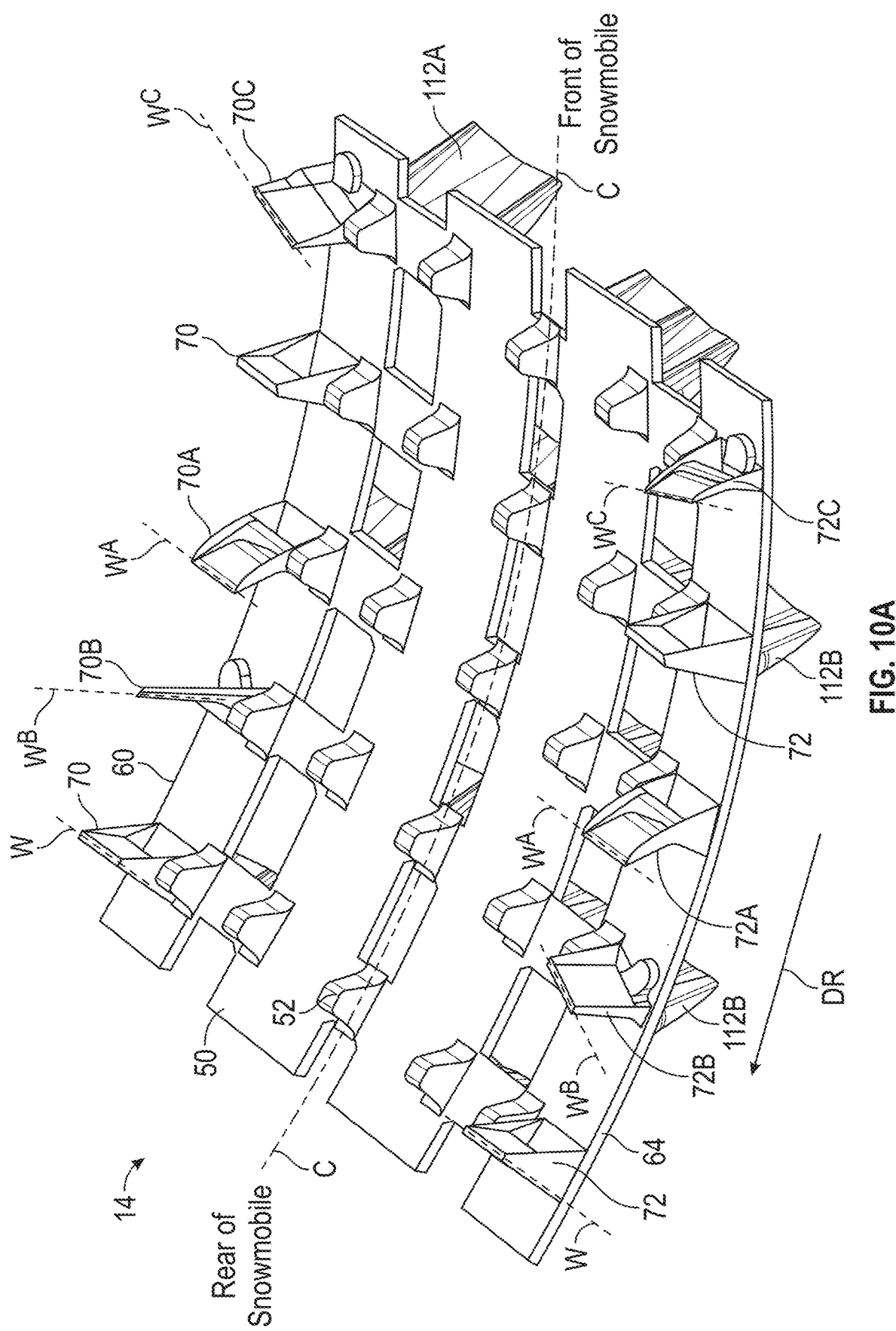
FIG. 10A is a perspective view of an additional exemplary track in accordance with the present disclosure.
Figure 10B:
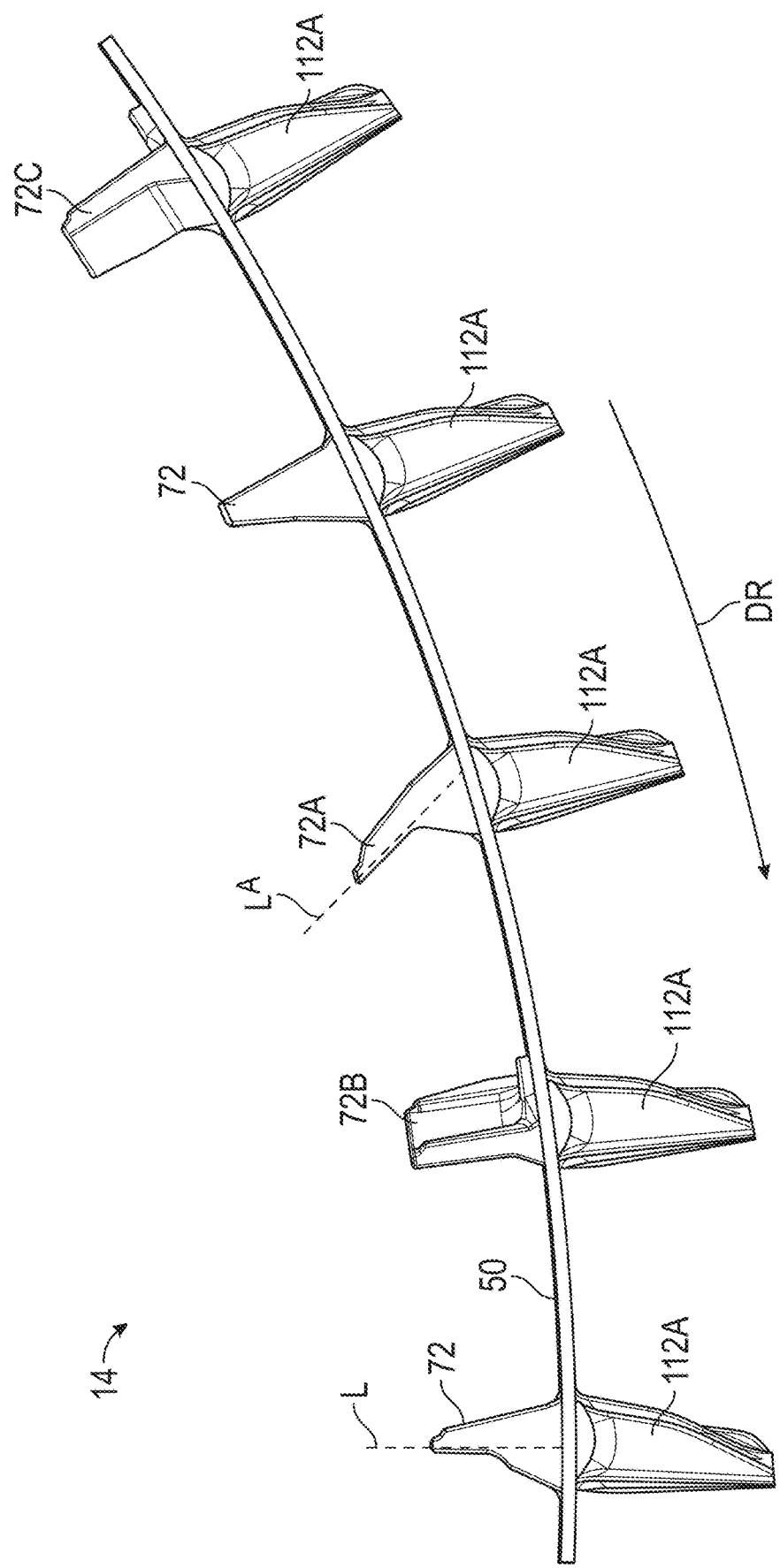
FIG. 10B is a side view of the track of FIG. 10A.
Figure 10C:
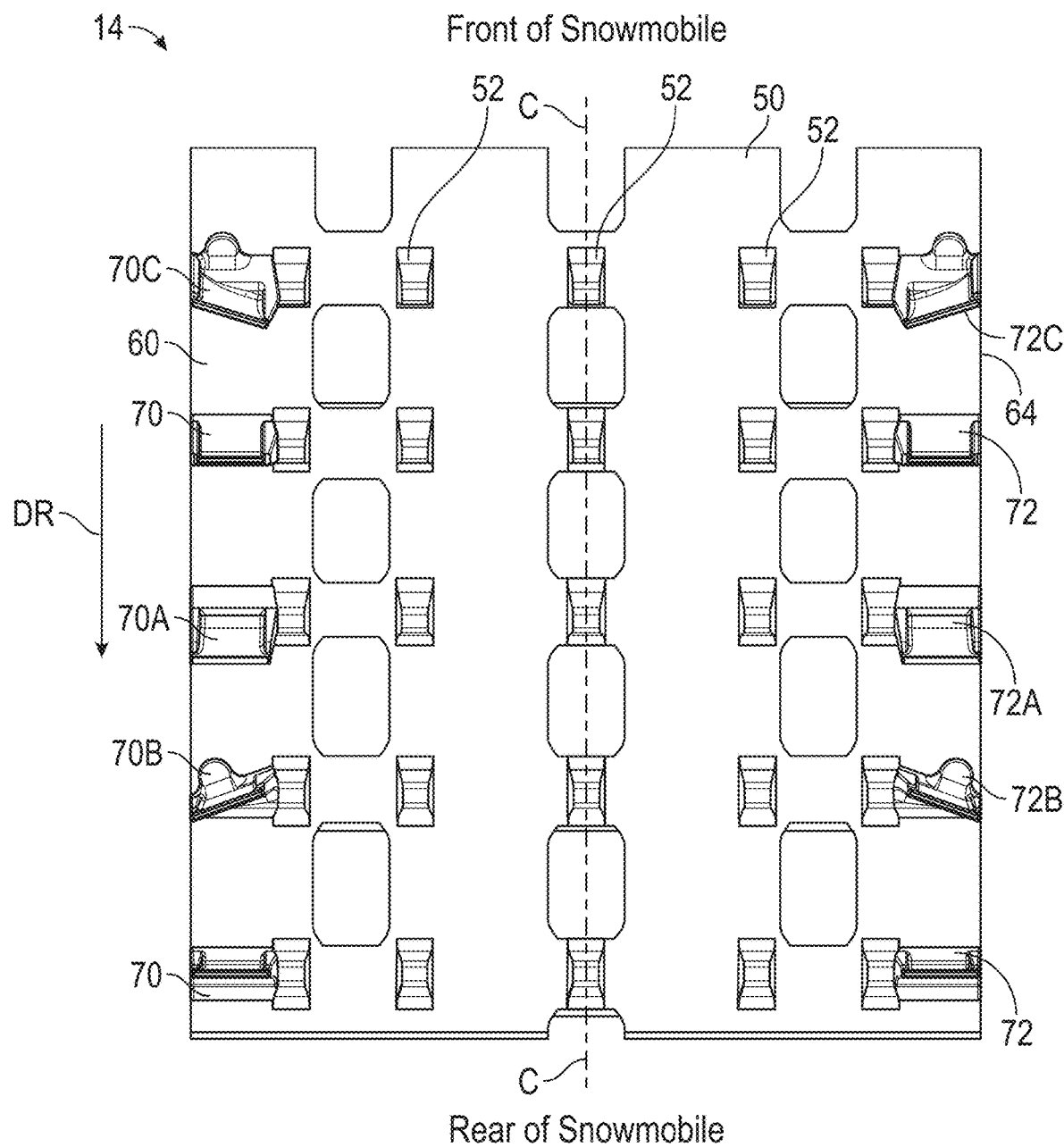
FIG. 10C is a plan view of the track of FIG. 10A.

With additional reference to FIGS. 10A, 10B, and 10C, the track 14 may be configured with first inner treads 70 and second inner treads 72 extending at various different angles (such as various different pitch and yaw angles) relative to the inner drive surface 50. Any of the first inner treads 70 and the second inner treads 72 described and illustrated throughout this application may have varying pitch and yaw angles as illustrated in FIGS. 10A, 10B, and 10C. Thus, although FIGS. 10A, 10B, and 10C do not illustrate the first angled surface 90 and the second angled surface 92, the track 14 as illustrated in FIGS. 10A, 10B, and 10C may include the first and second angled surfaces 90, 92.

The first and second inner treads 70 and 72 each have a length L (see FIG. 10B, for example) extending from, and perpendicular to, the inner drive surface 50, for example. The first and second inner treads 70 and 72 each have a width W (see FIG. 10A, for example) extending perpendicular to the center line C, perpendicular to the first side surface 60, and perpendicular to the second side surface 64. The first and second inner treads 70 and 72 may have lengths L and widths W extending at any other suitable angle (such as any suitable pitch and yaw angle) relative to the center line C, the first side surface 60, and the second side surface 64, such as, but not limited to, the examples described below and illustrated in FIGS. 10A, 10B, and 10C.

For example and as illustrated in FIGS. 10A-10C, the first and second inner treads 70A and 72A, may each have lengths $L^A$ that extend at a pitch angle, i.e., are nonorthogonal to the inner drive surface 50 and angled rearward relative to the direction of rotation DR of the track 14 (away from the front of the snowmobile 10) when the track is moving forward. The first and second inner treads 70A, 72A may have widths $W^A$ extending that extend at yaw angle, i.e., substantially perpendicular to each of the center line C, the first side surface 60, and the second side surface 64.

As illustrated in the examples of FIGS. 10A-10C, the first and second inner treads 70B and 72B may have widths $W^B$ extend at a yaw angle, i.e., nonorthogonal to each of the center line C, the first side surface 60, and the second side surface 64. The yaw angle is defined by the orientation of the line extending along the width $W^B$ relative to the center line C. The widths $W^B$ may be angled such that outermost portions of the first and second inner treads 70B and 72B proximate to the first and second side surfaces 60, 64 respectively are rearward of innermost portions of the treads 70B, 72B relative to the direction of rotation DR of the track 14 (away from the front of the snowmobile 10) when the track is moving forward. The first and second inner treads 70C and 72C are similar to the treads 70B, 72B but are angled in an opposite direction (opposite yaw angle) such that the outermost portions thereof proximate to the first and second side surfaces 60, 64 respectively are forward of innermost portions of the treads 70B, 72B relative to the direction of rotation DR of the track 14 (away from the front of the snowmobile 10) when the track is moving forward. Exemplary yaw angles include, but are not limited to +/−20°. Exemplary pitch angles include, but are not limited to, +/−30°.

The track 14 advantageously allows the suspension and track 14 to stay rigid and coupled to the existing chassis 12 as one. This ensures that the chassis 12 does not act independently of the track and rear suspension assembly 40. The rigid coupling configuration reduces unpredictability, sidehill effort, and increases flickability in comparison with other pivoting/flexible track and suspension designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An endless track for propelling a snowmobile, the endless track comprising:
   an inner drive surface;
   an outer ground-engaging surface opposite to the inner drive surface;
   a first side surface;
   a second side surface opposite to the first side surface;
   a plurality of first side inner treads adjacent to the first side surface; and
   a plurality of second side inner treads adjacent to the second side surface;
   wherein the plurality of first side inner treads extend outward from, and generally perpendicular to, the inner drive surface adjacent to the first side surface, each of the first side inner treads including a first thrust panel with lateral side supports configured to engage snow when the snowmobile is operated off-axis; and
   wherein the plurality of second side inner treads extend outward from, and generally perpendicular to, the inner drive surface adjacent to the second side surface, each of the second side inner treads including a second thrust panel with lateral side supports configured to engage snow when the snowmobile is operated off-axis.

2. The endless track of claim 1, wherein:
   at least two of the first side inner treads vary in pitch angle relative to the inner drive surface, and at least two of the second side inner treads vary in pitch angle relative to the inner drive surface; and
   at least two of the first side inner treads vary in yaw angle relative to the inner drive surface, and at least two of the second side inner treads vary in yaw angle relative to the inner drive surface.

3. The endless track of claim 1, further including first outer lugs extending from the outer ground-engaging surface adjacent to the first side surface and opposite to the plurality of first side inner treads; and
   second outer lugs extending from the outer ground-engaging surface adjacent to the second side surface and opposite to the plurality of second side inner treads.

4. The endless track of claim 3, wherein the first outer lugs are spaced apart around the outer ground-engaging surface, between pairs of the first outer lugs arranged at the first side surface is one first outer lug axially spaced from the first side surface; and
   wherein the second outer lugs are spaced apart around the outer ground-engaging surface, between pairs of the second outer lugs arranged at the second side surface is one second outer lug axially spaced from the second side surface.

5. The endless track of claim 3, wherein each one of first side inner treads is integral with one of the first outer lugs, and each one of the second side inner treads is integral with one of the second outer lugs.

6. The endless track of claim 1, wherein adjacent to each one of the first side inner treads is a first recess defined by the first side surface, and adjacent to each one of the second side inner treads is a second recess defined by the second side surface.

7. The endless track of claim 6, wherein the first recesses each include a linear edge extending perpendicular to a center line of the endless track, the linear edge is adjacent to one of the first side inner treads; and
   wherein the second recesses each include a linear edge extending perpendicular to the center line of the endless track, the linear edge is adjacent to one of the second side inner treads.

8. The endless track of claim 7, wherein the first recesses each include a first angled surface extending non-orthogonally relative to the centerline of the endless track, and the second recesses each include a second angled surface extending non-orthogonally relative to the center line of the endless track.

9. The endless track of claim 1, wherein the plurality of first side inner treads are aligned with the plurality of second side inner treads across a centerline of the endless track.

10. The endless track of claim 1, wherein the plurality of first side inner treads are not aligned with the plurality of second side inner treads across a centerline of the endless track.

11. An endless track for propelling a snowmobile, the endless track comprising:
    an outer ground-engaging surface;
    an inner drive surface opposite to the outer-ground engaging surface;
    a first side surface;
    a second side surface opposite to the first side surface;
    outer lugs extending from the outer ground-engaging surface;
    drive lugs extending from the inner drive surface and configured to cooperate with a drive member of the snowmobile for rotating the endless track;
    first side inner treads spaced laterally apart from the drive lugs and extending from the inner drive surface adjacent to the first side surface, behind the first side inner treads the first side surface defines first recesses;
    second side inner treads spaced laterally apart from the drive lugs and extending from the inner drive surface adjacent to the second side surface, behind the second side inner treads the second side surface defines second recesses;
    wherein each one of the first side inner treads and each one of the second side inner treads is positioned opposite to one of the outer lugs to form one of a plurality of continuous thrust panels extending between the inner drive surface and the outer ground-engaging surface; and
    wherein the first recesses and the second recesses are configured to expose the plurality of continuous thrust panels to snow when the snowmobile is operated off-axis.

12. The endless track of claim 11, wherein:
at least two of the first inner treads vary in pitch angle relative to the inner drive surface, and at least two of the second inner treads vary in pitch angle relative to the inner drive surface; and
at least two of the first inner treads vary in yaw angle relative to the inner drive surface, and at least two of the second inner treads vary in yaw angle relative to the inner drive surface.

13. The endless track of claim 11, wherein the first inner treads are offset from the second inner treads relative to a center line of the endless track.

14. The endless track of claim 11, wherein the outer lugs are arranged in aligned pairs on opposite sides of a center line of the endless track.

15. The endless track of claim 11, wherein behind each one of the first inner treads is a first edge of the first side surface extending perpendicular to the center line of the endless track, and behind each one of the second inner treads is a second edge of the second side surface extending perpendicular to the center line of the endless track.

16. The endless track of claim 11, wherein the first recesses are offset from the second recesses relative to a center line of the endless track.

17. The endless track of claim 11, wherein the first recesses and the second recesses taper inward towards a center line of the endless track.

18. The endless track of claim 11, wherein each one of the first inner treads and each one of the second inner treads is integral with one of the outer lugs.

* * * * *